United States Patent
Zambrano et al.

(10) Patent No.: US 7,276,809 B2
(45) Date of Patent: Oct. 2, 2007

(54) WIND TURBINE ASSEMBLY AND RELATED METHOD

(75) Inventors: Thomas Zambrano, Long Beach, CA (US); Tyler MacCready, Altadena, CA (US)

(73) Assignee: AeroVironment, Inc., Monrovia, CA (US)

( * ) Notice: Subject to any disclaimer, the term of this patent is extended or adjusted under 35 U.S.C. 154(b) by 0 days.

(21) Appl. No.: 11/325,850

(22) Filed: Jan. 4, 2006

(65) Prior Publication Data

US 2007/0152454 A1    Jul. 5, 2007

(51) Int. Cl.
- *F03D 9/00* (2006.01)
- *H02P 9/04* (2006.01)
- *F03B 13/00* (2006.01)
- *E04D 3/38* (2006.01)
- *E04D 3/40* (2006.01)

(52) U.S. Cl. ............... 290/55; 290/54; 290/43; 290/44

(58) Field of Classification Search ............ 290/43–44, 290/54–55
See application file for complete search history.

(56) References Cited

U.S. PATENT DOCUMENTS

| | | | | |
|---|---|---|---|---|
| 2,360,791 A * | 10/1944 | Putnam | ....................... | 416/37 |
| 3,793,530 A | 2/1974 | Carter | ....................... | 290/55 |
| 3,832,853 A | 9/1974 | Butler, Jr. | ................. | 60/641.12 |
| 3,956,902 A | 5/1976 | Fields, Jr. | ..................... | 62/3.3 |
| 4,068,132 A | 1/1978 | Bardekoff | ..................... | 290/55 |
| 4,119,863 A * | 10/1978 | Kelly | ........................... | 290/55 |
| 4,166,222 A | 8/1979 | Hanley | ........................ | 290/55 |
| 4,242,043 A * | 12/1980 | Poulsen | ...................... | 416/11 |
| 4,319,141 A | 3/1982 | Schmugge | ................... | 290/52 |
| 4,321,476 A | 3/1982 | Buels | ........................... | 290/55 |
| 4,449,889 A * | 5/1984 | Belden | ....................... | 416/16 |
| 4,471,612 A | 9/1984 | Buels | ........................... | 60/398 |
| 4,557,666 A * | 12/1985 | Baskin et al. | ................ | 416/32 |
| 4,565,929 A * | 1/1986 | Baskin et al. | ................ | 290/44 |
| 4,609,827 A * | 9/1986 | Nepple | ........................ | 290/44 |
| 4,630,996 A * | 12/1986 | Masaki | ........................ | 416/16 |
| 5,178,518 A * | 1/1993 | Carter, Sr. | ..................... | 416/11 |
| 5,213,470 A * | 5/1993 | Lundquist | ....................... | 416/9 |
| 5,272,378 A | 12/1993 | Wither | ........................ | 290/1 R |
| 5,295,793 A * | 3/1994 | Belden | ........................ | 416/13 |
| 5,365,424 A | 11/1994 | Deam et al. | ................. | 363/144 |
| 5,394,016 A | 2/1995 | Hickey | ........................ | 290/55 |
| 5,512,787 A | 4/1996 | Dederick | ..................... | 290/4 R |
| 5,512,788 A | 4/1996 | Berenda et al. | ............... | 290/55 |
| 5,642,984 A | 7/1997 | Gorlov | ....................... | 416/176 |

(Continued)

FOREIGN PATENT DOCUMENTS

DE    29 51 085 A1    12/1979

(Continued)

*Primary Examiner*—Darren Schuberg
*Assistant Examiner*—Pedro J. Cuevas
(74) *Attorney, Agent, or Firm*—Sheppard, Mullin, Richter & Hampton LLP

(57) ABSTRACT

Wind turbine assembly, and related method, is provided that exploits an aerodynamically enhanced wind region of a building in proximity to a parapet of the building. A wind turbine assembly includes a support assembly configured to couple to a building in proximity to a parapet of the building and a rotor assembly coupled to the support assembly such that its rotor is oriented relative to the enhanced wind region to optimize electrical generation.

11 Claims, 6 Drawing Sheets

U.S. PATENT DOCUMENTS

| | | | |
|---|---|---|---|
| 6,041,596 A | 3/2000 | Royer | 60/398 |
| 6,097,104 A | 8/2000 | Russell | 290/54 |
| 6,172,429 B1* | 1/2001 | Russell | 290/54 |
| 6,294,844 B1 | 9/2001 | Lagerwey | 290/55 |
| 6,327,957 B1* | 12/2001 | Carter, Sr. | 91/41 |
| 6,479,907 B1 | 11/2002 | Eriksson et al. | 290/44 |
| 6,518,680 B2* | 2/2003 | McDavid, Jr. | 290/54 |
| 6,590,363 B2 | 7/2003 | Teramoto | 320/101 |
| 6,601,348 B2* | 8/2003 | Banks et al. | 52/25 |
| 6,606,828 B1* | 8/2003 | Lin et al. | 52/58 |
| 6,616,402 B2* | 9/2003 | Selsam | 415/3.1 |
| 6,710,469 B2* | 3/2004 | McDavid, Jr. | 290/55 |
| 6,765,309 B2 | 7/2004 | Tallal, Jr. et al. | 290/55 |
| 6,800,955 B2* | 10/2004 | McDavid, Jr. | 290/54 |
| 6,974,307 B2* | 12/2005 | Antoune et al. | 416/9 |
| 7,084,520 B2* | 8/2006 | Zambrano et al. | 290/44 |
| 7,084,523 B2* | 8/2006 | Noguchi et al. | 290/55 |
| 7,132,760 B2* | 11/2006 | Becker | 290/55 |
| 7,215,039 B2* | 5/2007 | Zambrano et al. | 290/55 |
| 2002/0040555 A1* | 4/2002 | Banks et al. | 52/90.1 |
| 2002/0109055 A1* | 8/2002 | Davis, Jr. | 248/188.5 |
| 2002/0109358 A1* | 8/2002 | Roberts | 290/54 |
| 2003/0056506 A1 | 3/2003 | Cutcher | 60/398 |
| 2004/0031902 A1* | 2/2004 | Davis, Jr. | 248/519 |
| 2004/0061337 A1* | 4/2004 | Becker | 290/44 |
| 2004/0076518 A1* | 4/2004 | Drake | 416/10 |
| 2004/0197188 A1* | 10/2004 | Drake | 415/4.1 |
| 2005/0006904 A1* | 1/2005 | Bayer | 290/55 |
| 2005/0099013 A1* | 5/2005 | Noguchi | 290/55 |
| 2005/0242590 A1* | 11/2005 | Zambrano et al. | 290/44 |
| 2006/0108809 A1* | 5/2006 | Scalzi | 290/55 |
| 2007/0018462 A1* | 1/2007 | Richards et al. | 290/55 |

FOREIGN PATENT DOCUMENTS

| | | |
|---|---|---|
| JP | 10140859 | 11/1996 |
| JP | 2001193631 | 1/2000 |
| JP | 2002004302 | 6/2000 |
| JP | 2003166462 | 11/2001 |
| WO | 03067081 A1 | 8/2003 |

* cited by examiner

WIND TURBINE ASSEMBLY AND RELATED METHOD

BACKGROUND OF THE INVENTION

The present invention relates generally to wind turbines and, more particularly, to wind turbines for use in small-scale applications. The present invention also relates to a method of using wind turbines in small-scale applications.

Electrical power generation from environmentally friendly sources, or "alternative energy sources," has long been a goal of many, for both environmental and economic concerns. Wind-powered generators have been used for this purpose. Generally speaking, wind turbines transfer the wind's kinetic energy into electrical energy. This has been achieved by exposing a rotor to wind. The rotor turns a generator typically mounted aft of the rotor, driving the generator to create electricity. The rotor and generator combination (i.e., wind turbine generator) is mounted at the top of a tower high above the ground to expose it to high winds. The tower is attached to a foundation and is configured to endure significant structural loads.

Government incentives exist promoting the use of alternative sources of electricity, in both utility-scale and small-scale applications. Wind turbine generators have been particularly successful in utility-scale applications. In such applications, fields of large wind turbine generators are used. These wind turbines can exceed a height of 200 feet. Some utility-scale installations generate in excess of 100 megawatts. However, such installations are very costly. A number of factors must properly align to make such an investment worthwhile, including location, government incentives, electricity costs, and turbine costs. Thus, utility-scale installations can play an important, but not exclusive role, as an alternative source of electricity.

Wind turbine generators have also been used in small-scale applications, typically ranging between 50 watts and 100 kilowatts. Even for small-scale applications, a number of factors must be satisfied to make the investment worthwhile. For example, proper location and mounting of wind generators can be an issue. In many current approaches, a single, relatively small, wind turbine is mounted on a tower away from other structures such that the turbine is spaced away from turbulent flow caused by such structures. Thus, current approaches are typically limited to rural settings and are impractical in many other settings.

It should, therefore, be appreciated that there exists a need for a wind turbine system for use in small-scale applications in a broad range of settings, including industrial settings, that is cost-effective, environmentally safe, and does not hamper other systems. The present invention fulfills this need and others.

SUMMARY OF THE INVENTION

The invention is embodied in a wind turbine assembly that exploits an aerodynamically enhanced wind region of a building. A wind turbine assembly includes a support assembly configured to couple to a building in proximity to a parapet of the building and a rotor assembly coupled to the support assembly such that its rotor is oriented relative to the enhanced wind region to optimize electrical generation.

In an exemplary embodiment, the rotor includes a plurality of blades radiating outwardly from a central hub thereby defining an axis of rotation. The rotor is configured to rotate by facing the wind such that the axis of rotation is aligned with the wind flow. Preferably, the rotor is mounted in such a manner that it is confined within the enhanced wind region and, more preferably, such that it is pitched downward relative to the parapet, when in use.

In another exemplary embodiment, the rotor includes an elongated hub, a plurality of airfoils disposed about the hub, and a plurality of arms the couple the airfoils to the hub. Preferably, the rotor is oriented in such a manner that the airfoils disposed in a bottom portion of the rotor's rotation are disposed in a wind shadow of the parapet, providing for optimum performance.

In yet another exemplary embodiment, the rotor includes an elongated hub and a plurality of drag blades disposed about the hub. Preferably, the rotor is oriented in such a manner that the drag blades disposed in a bottom portion of the rotor's rotation are disposed in a wind shadow of the parapet, and the drag blades are curved to face concavely towards the wind in an upper portion of the rotor's rotation.

In a detailed aspect of an exemplary embodiment, a wind turbine assembly includes a support assembly a base configured to couple to a building in proximity to a parapet of the building and a support extending from the base. A rotor assembly includes a housing adjustably coupled to the support of the support assembly and a rotor coupled to the housing. The rotor including a plurality of blades radiating outwardly from a central hub thereby defining an axis of rotation configured to rotate by facing the wind such that the axis of rotation is generally aligned with the wind flow.

In another detailed aspect of an exemplary embodiment, the support includes a curved upper portion, and the housing of the rotor assembly includes a sleeve disposed about the support of the support assembly. The sleeve is configured to be axially displaced along the upper portion to adjust the pitch angle of the rotor assembly.

In yet another detailed aspect of an exemplary embodiment, the rotor assembly is configured to rotate about the support to adjust the pitch angle of the rotor assembly.

In a distinct and independent aspect of the invention, a method of generating electrical power is provided in which a wind turbine assembly is positioned in proximity to a parapet of a building, such that the wind turbine assembly is exposed to an enhanced wind region created as wind travels over the building. The wind turbine assembly includes a support assembly a base configured to couple to a building in proximity to a parapet of the building and having support extending from the base. A rotor assembly is also included, having a housing adjustably coupled to the support of the support assembly, and a rotor coupled to the housing. The rotor is coupled to an electric generator to generate an electrical current.

For purposes of summarizing the invention and the advantages achieved over the prior art, certain advantages of the invention have been described herein above. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
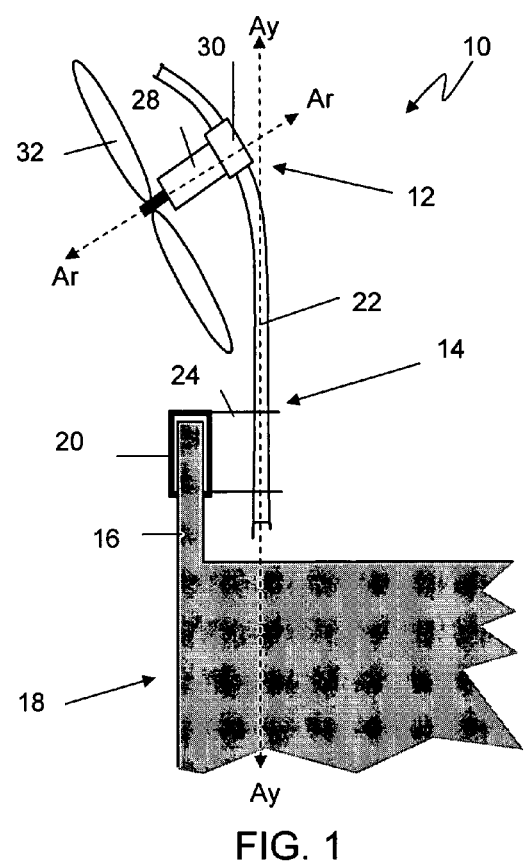
FIG. 1 is a side elevational view of a first embodiment of a wind turbine assembly in accordance with the present invention, depicting a rotor assembly adjustably mounted to a support pole to adjust pitch angle of the rotor assembly.
Figure 2:
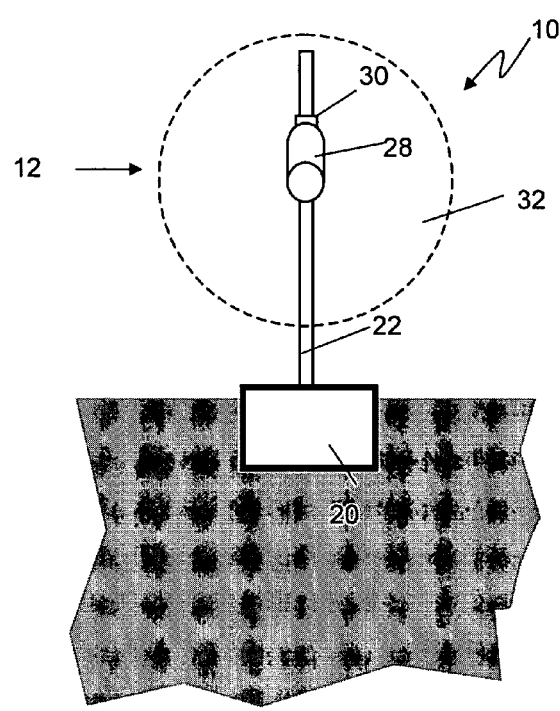
FIG. 2 is front elevational view of the wind turbine assembly of FIG. 1, depicting the support pole extending from a mounting assembly coupled to a wall.
Figure 3:
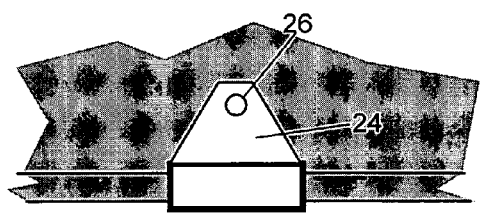
FIG. 3 is a top view of the mounting assembly of wind turbine assembly of FIG. 1, depicting marking for adjusting yaw.

With reference to the illustrative drawings, and particularly to FIG. 1, there is shown a wind turbine assembly 10, including a rotor assembly 12 and a support assembly 14 that couples the assembly to a parapet 16 of a building 18. The wind turbine assembly mounts atop the building, to exploit an enhanced wind zone created as wind accelerates over the parapet. More particularly, the rotor assembly is oriented such that its axis of rotation ($A_r$) is aligned with the wind flow, as it passes over the parapet of the building. The orientation of the rotor assembly can be adjusted. This allows a user to maintain optimal performance, even as weather conditions change.

Figure 4:
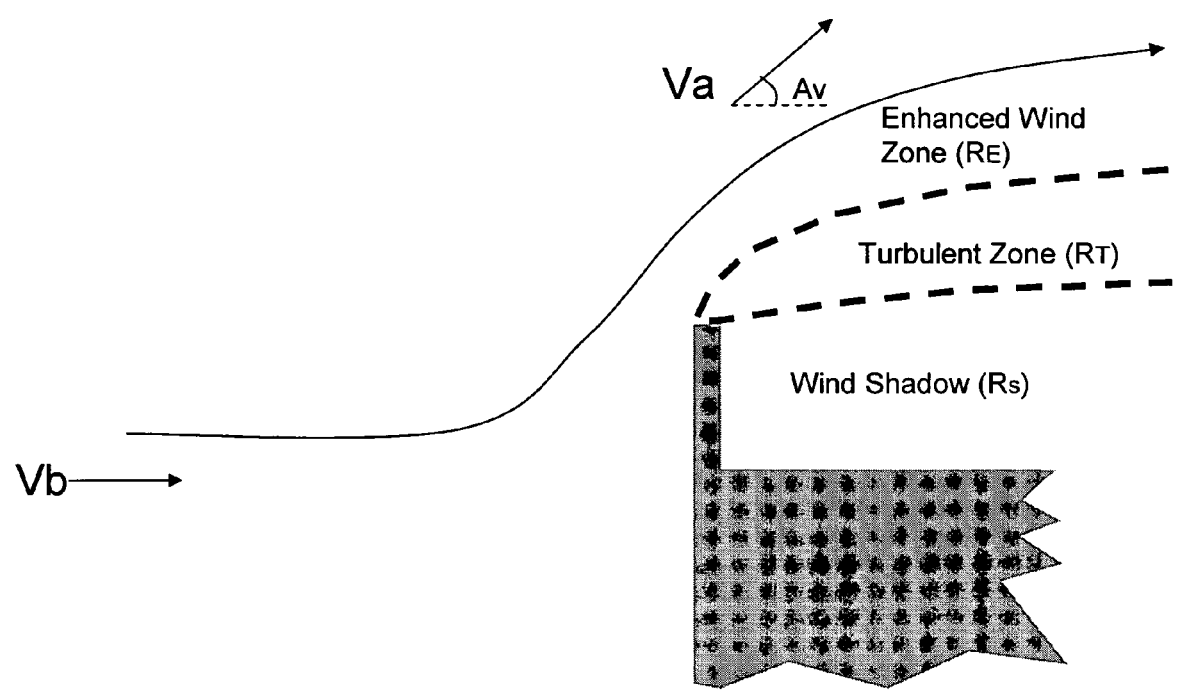
FIG. 4 is a simplified side elevational view of the wall of FIG. 1, depicted various wind zones disposed about the wall.

With reference now to FIG. 4, several distinct wind flow regions are created in proximity to the parapet 16. The present inventors have found that as wind encounters a building, an enhanced wind flow region ($R_E$) is formed as the wind flows above the parapet. A wind shadow ($R_s$) is formed directly behind the parapet, in which the wind speed is effectively zero. A turbulent wind flow ($R_T$) is found in the region between the wind shadow ($R_S$) and the enhanced flow region ($R_E$).

In the enhanced wind flow region ($R_E$), the wind velocity ($V_a$) is higher than the baseline velocity ($V_b$) of wind, and it is typically characterized by laminar flow. Moreover, it has been found that the wind in this region ($R_E$) is typically angled ($A_v$) relative to horizontal. Various factors can influence the wind angle ($A_v$) as the wind passes over the parapet, including, e.g., building configuration, building orientation, prevailing wind, temperature, and pressure.

The wind turbine assembly 10 is configured to exploit the enhanced wind zone ($R_E$). To that end, the rotor assembly 12 is preferably confined in the enhanced wind flow region and is pitched downwardly to face the wind directly. This promotes efficient energy generation.

For example, in an illustrative scenario, a rectangular, low-rise. building encounters a prevailing wind normal to a side wall. It has been calculated that within 10 percent of the building height from the top of the parapet there is approximately 20 percent increase in the mean resultant wind speed. The resultant wind vector is pitched normal to the roofline at about a 20-degree angle for a considerable distance above the parapet.

With reference again to FIG. 1, the support assembly 14 includes a base 20 attached to the parapet of the building and a support pole 22, extending upwardly from the base. The base includes a pair of horizontal flanges 24 that define aligned openings 26 for receiving the support pole. The support pole is mounted through the opening such that axial movement is inhibited. However, in the exemplary embodiment, the support pole can rotate freely. This allows the wind turbine assembly to yaw, as needed.

For example, if the wind direction is angled relative to the wall's normal axis, the resulting force on the rotor assembly will cause the support pole to rotate, allowing the rotor assembly to face the wind directly. Oftentimes, a building wall is not oriented precisely normal to the prevailing winds. In such situations, the horizontal component of the wind as it travel over the building will likely not be normal to the wall. Since the vertical support can rotate freely, the rotor assembly can be selectively oriented in yaw to face the wind.

The support pole 22 includes a curved upper portion. The rotor assembly 12 is mounted to the support pole in such a manner that it can be positioned along the length of the support pole. This allows a user to adjust the pitch axis of the rotor assembly simply by repositioning the rotor assembly along the length of the support pole.

In the exemplary embodiment, the curved upper portion of the vertical pole allows for pitch adjustment ranging from about 0 degrees to about 40 degrees, as measured from the roofline. In this manner, the wind turbine assembly can be optimized for use across a wide variety of site installations. The wind turbine assembly can further include a protective guard (not shown) disposed about the rotor for protection against bird strikes, among other things.

The rotor assembly 12 includes a housing 28 having a sleeve 30 disposed about the support post. The sleeve includes a locking apparatus that can secure the rotor assembly to any one of various positions along the support post. The rotor assembly includes a rotor 32 coupled to a generator set (not shown) disposed within the housing.

In the exemplary embodiment, the rotor 32 is about four feet in diameter and includes four blades; however, the number, size and aerodynamic configuration of the blades can be optimized for different installation needs. Rotation of the rotor drives the generator set, inducing the generation of electrical current. The generator set can be aligned along the rotor's axis of rotation or otherwise in mechanical connection to the rotor. For example, the generator set can be mounted at the hub of the rotor, or placed in the periphery of the housing connect to the rotor by a chain or other motive connection.

The generator set converts mechanical energy from the rotor's rotation into electrical energy. Generally speaking, the generator set includes an electrical generator, e.g., an alternator, and associated electronics to conform the generated electricity within prescribed parameters. Various generator configurations known in the art can be used, such as those available from Southwest Windpower Inc., of Flagstaff, Ariz. Selection of a particular generator configuration can be based upon a number of factors and trade-offs, such as cost, efficiency, prevailing wind parameters, electrical power requirements, and size to name a few.

For example, in the exemplary embodiment, the generator set can include a three-phase brushless permanent magnet alternator, along with associated electronics to rectify the power to direct current and a voltage regulator to keep voltage from rising over a set point such as 48 volts. At a continuous wind speed of 20 mph, the generator can generate about 200 watts of direct current at a regulated voltage of 48 volts. Since power equals voltage multiplied by current, each wind turbine in this example would provide a direct current of about 4.2 amps.

In the exemplary embodiment, only one wind turbine assembly 10 is shown. However, a plurality of wind turbines can be disposed along the building, as desired. The electrical flow from numerous individual wind turbines can be accumulated by connection to a busway. Examples of useful busway configurations as well as other features for wind turbine assemblies can be found in U.S. application Ser. No. 10/838,434, entitled "Wind Turbine System and Method of Use," filed May 3, 2004, now U.S. Pat. No. 7,084,520, which is herein incorporated by reference, for all purposes.

Figure 5:
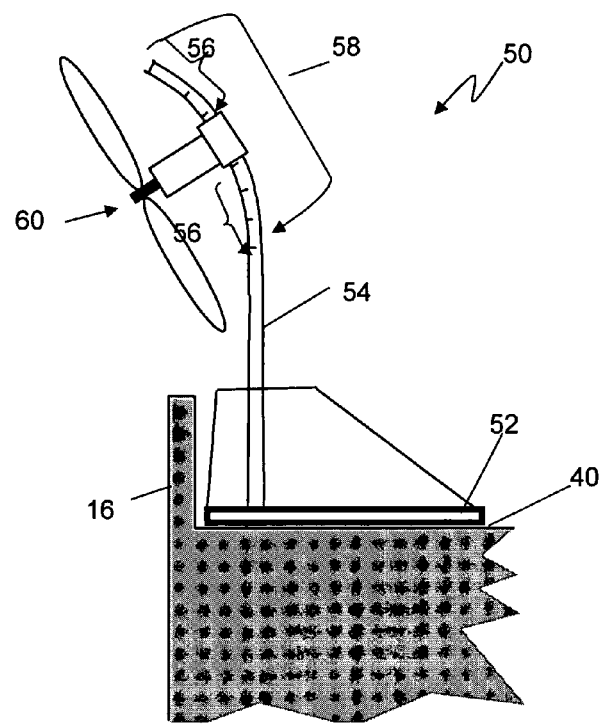
FIG. 5 is a side elevational view of a second embodiment of a wind turbine assembly in accordance with the present invention, depicting a rotor assembly adjustably mounted to a support pole to adjust pitch angle of the rotor assembly.
Figure 6:
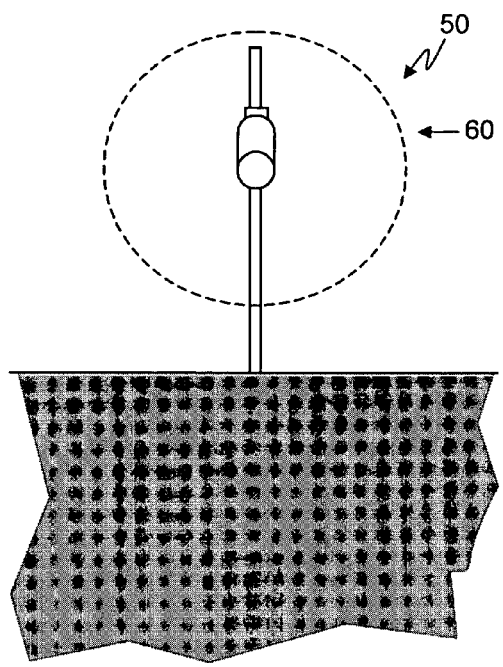
FIG. 6 is front elevational view of the wind turbine assembly of FIG. 5, depicting the support pole extending above a parapet of a wall.
Figure 7:
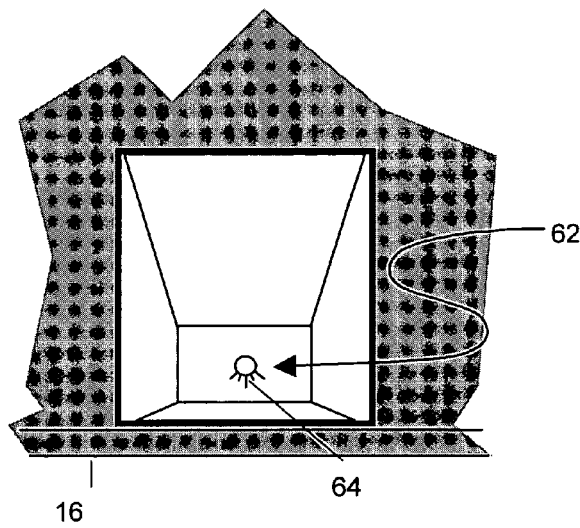
FIG. 7 is a top view of the mounting assembly of wind turbine assembly of FIG. 5, depicting marking for adjusting yaw.

With reference now to FIGS. 5-7, there is shown a second embodiment for a wind turbine assembly 50, having a base 52 positioned on the roof 40 of the building 18 adjacent to the parapet 16. The wind turbine includes a support pole 54 similar to the first embodiment, further having markings 56 disposed along an upper portion 58 of the pole. The markings designate pitch angles for the rotor assembly 60. A user easily set the rotor assembly at a prescribed pitch angle by aligning it at the appropriate marking.

The support pole 54 is mounted through an opening 62 defined by the base 52. In this embodiment, the support pole is mounted to the base such that the yaw angle of the rotor assembly 60 can be set by turning the pole, as opposed to the free rotation allowed in the first embodiment. As best seen in FIG. 7, markings 64 are provided about the opening so that a user can align the pole at a prescribed yaw angle.

Figure 8:
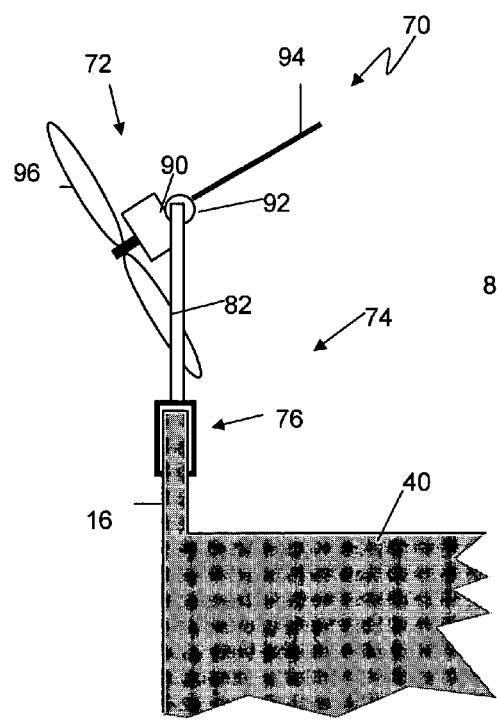
FIG. 8 is a side elevational view of a third embodiment of a wind turbine assembly in accordance with the present invention, depicting a rotor assembly adjustably mounted to a support pole to adjust pitch angle of the rotor assembly.
Figure 9:
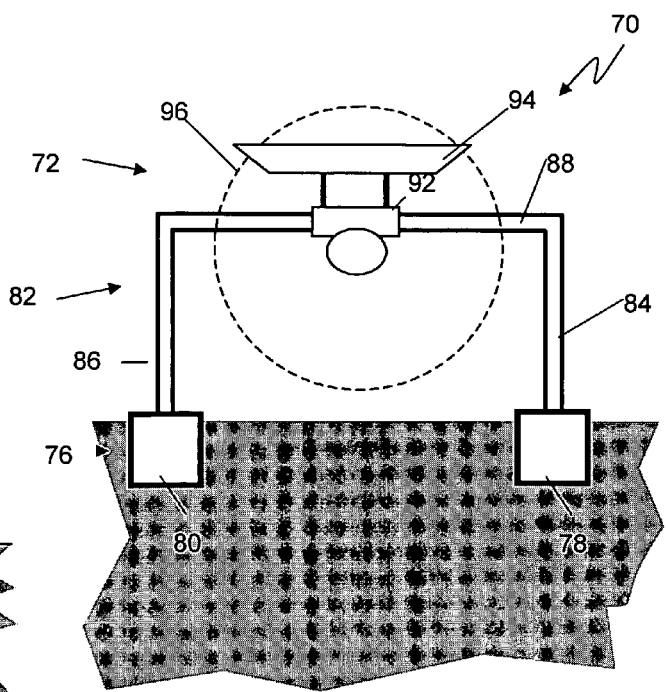
FIG. 9 is a front elevational view of the wind turbine assembly of FIG. 8, depicting the support pole extending above a parapet of a wall.
Figure 10:
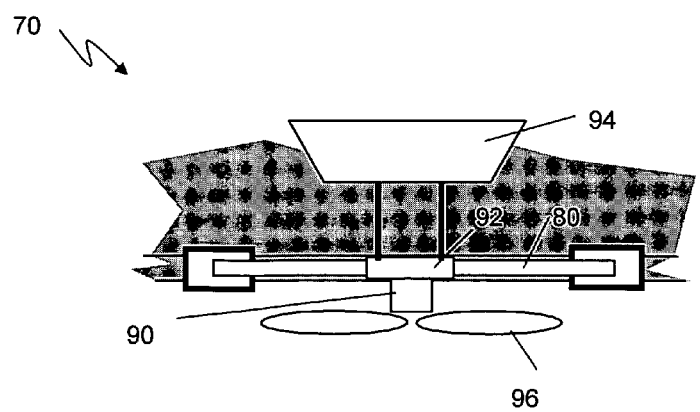
FIG. 10 is a top view of the mounting assembly of wind turbine assembly of FIG. 8, depicting marking for adjusting yaw.

With reference now to FIGS. 8-9, there is shown a third embodiment of a wind turbine assembly 70, having a rotor assembly 72 pivotally mounted to a support assembly 74. The support assembly includes a base 76 attached to the parapet 16 in a manner similar to the first embodiment. In this embodiment, the base includes a first section 78 and a second section 80.

The support assembly 74 further includes a support post 82, extending from the base. The support post includes a first leg 84 and the second leg 86 and an upper portion 88 extending therebetween. More particularly, the first leg extends from the first section of the base, and the second leg extends from the second section of the base. The upper portion is oriented generally horizontally, aligned with the upper edge of the parapet 16.

The rotor assembly 72 is pivotally mounted to the upper portion 88 of the support post 82. More particularly, the rotor assembly includes a housing 90 having a sleeve 92, disposed about the upper portion. The sleeve is coupled to the upper portion in such a manner that the rotor assembly can be set at a prescribed pitch angle. The housing further includes a tail section 94, extending rearward relative to the rotor 96. The tail section serves to balance the rotor assembly about the upper portion of the support post, as well as, maintaining the orientation of the rotor assembly relative to the wind.

Figure 11:
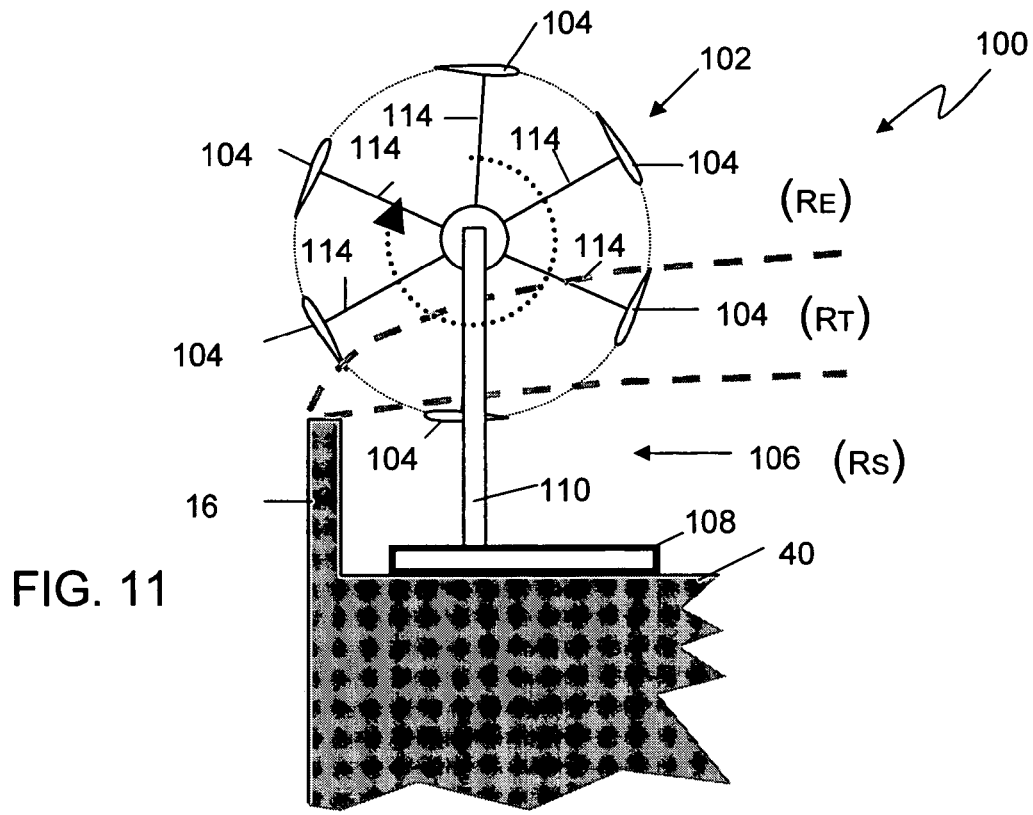
FIG. 11 is a side elevational view of a fourth embodiment of a wind turbine assembly in accordance with the present invention.
Figure 12:
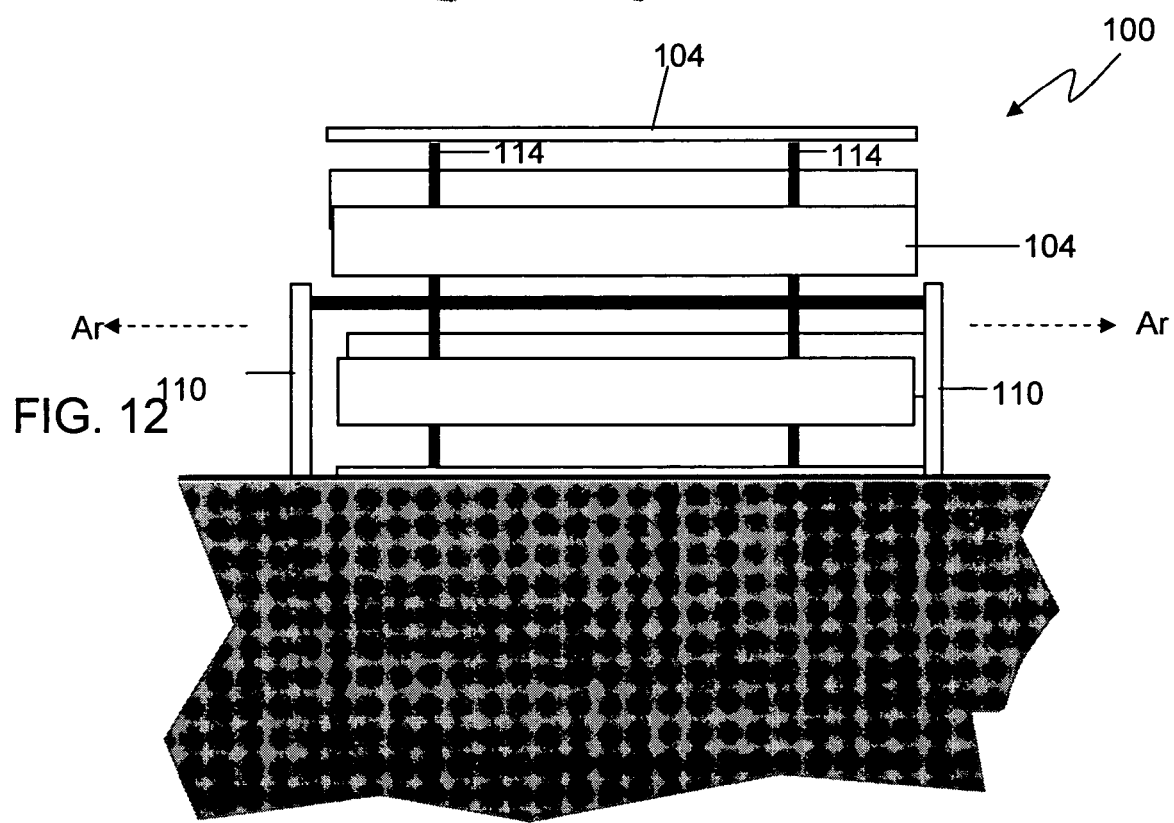
FIG. 12 is a front elevational view of the wind turbine assembly of FIG. 11.

With reference now to FIGS. 11-12, there is shown a fourth embodiment of a wind turbine assembly 100, having a rotor assembly 102 in which a series of airfoils 104 are arranged in parallel about an axis of rotation ($A_r$) oriented horizontally. The wind turbine assembly includes a support assembly 106 having a base 108 positioned on the roof 40 of the building adjacent to the parapet 16. The support assembly further includes support posts 110 sized to position the rotor assembly 102 for optimum performance relative to the enhanced wind region (Re).

The airfoils 104 are coupled to an elongated hub 112 via arms 114. As the wind passes along the rotor assembly 102, lift is generated by the airfoils, causing the hub to spin about its axis of rotation ($A_r$). The hub is coupled to a generator set (not shown). Notably, the rotor assembly is positioned such that as the airfoils pass through the bottom portion of the rotation, they are disposed in the wind shadow of the parapet. When shielded by the parapet in this manner, the blades move forward through slower air, minimizing drag on the rotor assembly.

Figure 13:
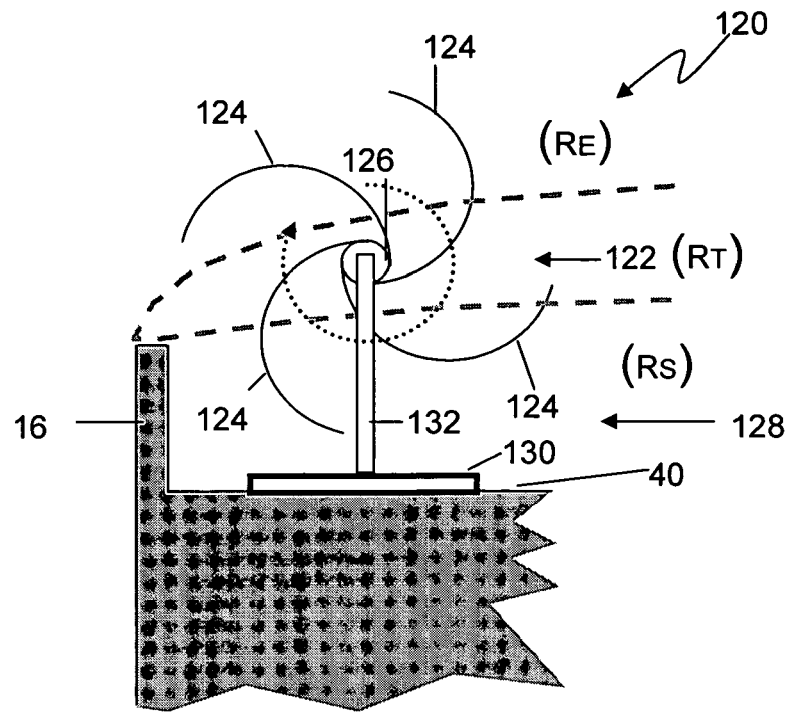
FIG. 13 is a side elevational view of a fifth embodiment of a wind turbine assembly in accordance with the present invention.
Figure 14:
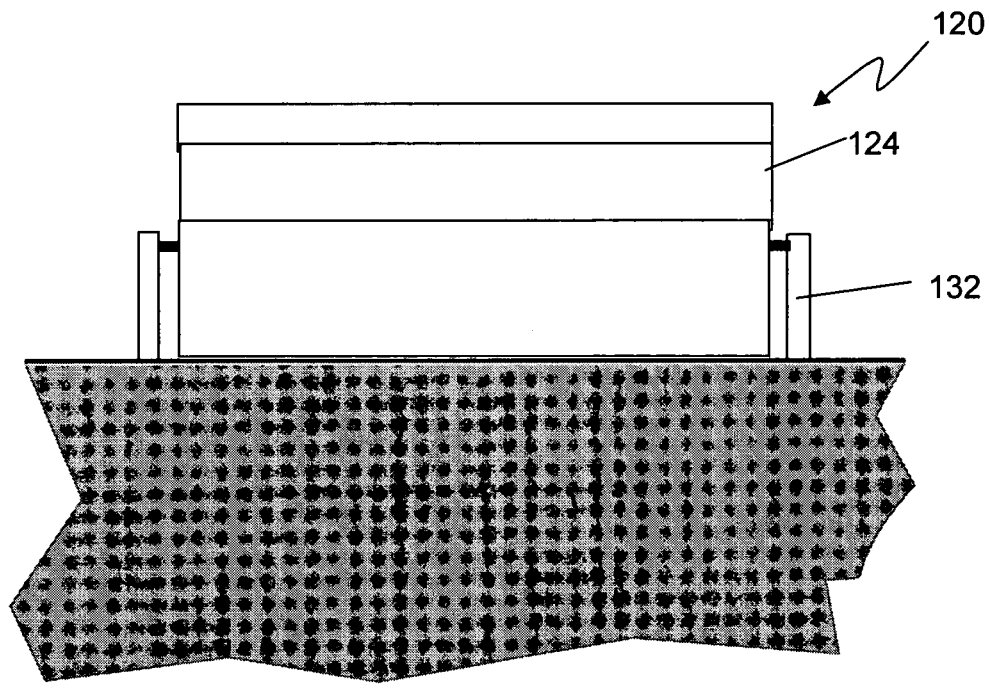
FIG. 14 is a front elevational view of the wind turbine assembly of FIG. 13.

With reference now to FIGS. 13-14, there is shown a fifth embodiment of a wind turbine assembly 120, having a rotor assembly 122 having a plurality of drag blades 124 extending from an elongated hub 126 that defines an axis of rotation ($A_r$). The hub is coupled to a generator set (not shown). The wind turbine assembly includes a support assembly 128 having a base 130 positioned on the roof 40 of the building adjacent to the parapet 16. The support assembly further includes support posts 132 sized to position the rotor assembly 122 for optimum performance relative to the enhanced wind region (Re). The drag blades are curved to face concavely towards the wind as it passes over the parapet. As the drag blades pass through the bottom portion of the rotation, they are disposed in the wind shadow of the parapet, to minimizing drag on the rotor assembly.

It should be appreciated from the foregoing description that the present invention provides a wind turbine assembly, and related method, that exploits an aerodynamically enhanced wind region of a building in proximity to a parapet of the building. A wind turbine assembly includes a support assembly configured to couple to a building in proximity to a parapet of the building and a rotor assembly coupled to the support assembly such that its rotor is oriented relative to the enhanced wind region to optimize electrical generation.

Although the invention has been disclosed in detail with reference only to the preferred embodiments, those skilled in the art will appreciate that various other embodiments of can be provided without departing from the scope of the invention. Accordingly, the invention is defined only by the claims set forth below.

What is claimed is:

1. A wind turbine assembly for mounting atop a building, comprising:
   a support assembly configured to mount atop a building, in proximity to a parapet of the building, wherein wind directed at a side of the building flows over the parapet to create an enhanced wind region above the parapet and a wind shadow behind the parapet; and
   a rotor assembly including a rotor coupled to an electric generator to generate an electrical current;
   wherein the rotor includes an elongated hub and a plurality of blades disposed about the hub;
   and wherein the rotor assembly is mounted to the support assembly in such a manner that wind flowing over the parapet interacts with the blades to cause the rotor to rotate about the axis of the elongated hub, with the blades disposed in an upper portion of the rotor's rotation disposed in the enhanced wind region and with the blades disposed in a bottom portion of the rotor's rotation disposed in the wind shadow of the parapet.

2. A wind turbine assembly as defined in claim 1, wherein:
   the plurality of blades include a plurality of airfoils disposed about the hub;
   the rotor further includes a plurality of arms that couple the airfoils to the hub, and
   the rotor is oriented relative to the support assembly in such a manner that the airfoils disposed in the upper portion of the rotor's rotation are disposed in the enhanced wind region and such that the airfoils disposed in the bottom portion of the rotor's rotation are disposed in the wind shadow of the parapet.

3. A wind turbine assembly as defined in claim 1, wherein the blades project outward from the hub and are curved to face concavely towards the wind in the upper portion of the rotor's rotation.

4. A wind turbine assembly for mounting atop a building, comprising:
   a support assembly including a base configured to couple to a building, in proximity to a parapet of the building, and further including an elongated pole projecting upward from the base, wherein wind directed at a side of the building flows over the parapet creating an enhanced wind region in proximity to the parapet in which the wind flows along a wind flow path that is angled upward relative to horizontal; and
   a rotor assembly including
      a sleeve adjustably disposed about the elongated pole of the support assembly, and
      a rotor coupled to the housing and to an electric generator to generate an electrical current, the rotor including a central hub and a plurality of blades projecting outward therefrom, thereby defining an axis of rotation,
      wherein the rotor assembly is coupled to the support assembly such that the rotor is located in the enhanced wind region and such that the rotor's axis of rotation is oriented at a selected, fixed downward pitch, in general alignment with the wind flow path;
   wherein the elongated pole of the support assembly includes a curved upper portion, and the sleeve of the rotor assembly is configured to be axially movable along the pole's curved upper portion, to orient the rotor's axis of rotation at the selected, fixed downward pitch.

5. A wind turbine assembly as defined in claim 4, wherein the upper portion of the elongated pole of the support assembly is curved such that the sleeve of the rotor assembly can be moved to a position where the rotor's axis of rotation has a selected downward pitch of up to 40 degrees relative to horizontal.

6. A wind turbine assembly as defined in claim 4, wherein the base of the support assembly mounts directly onto the parapet of the building.

7. A wind turbine assembly as defined in claim 4, wherein:
   the parapet of the building is an extension of a substantially vertical wall; and
   the base of the support assembly mounts atop the building, behind the parapet.

8. A wind turbine assembly as defined in claim 4, wherein the rotor of the rotor assembly is located entirely above the parapet.

9. A wind turbine assembly for mounting atop a building, comprising:
   a support assembly including a base configured to couple to a building, in proximity to a parapet of the building, and further including an elongated pole projecting upward from the base, wherein wind directed at a side of the building flows over the parapet creating an enhanced wind region in proximity to the parapet in which the wind flows along a wind flow path that is angled upward relative to horizontal; and
   a rotor assembly including
      a sleeve adjustably disposed about the elongated pole of the support assembly, and
      a rotor coupled to the housing and to an electric generator to generate an electrical current, the rotor including a central hub and a plurality of blades projecting outward therefrom, thereby defining an axis of rotation,
      wherein the rotor assembly is coupled to the support assembly such that the rotor is located in the enhanced wind region and such that the rotor's axis of rotation is oriented at a selected, fixed downward pitch, in general alignment with the wind flow path;
   wherein the sleeve of the rotor assembly is configured to be rotatable about the longitudinal axis of the elongated pole of the support assembly, to orient the rotor's axis of rotation in a selected yaw direction.

10. A method of generating electrical power, comprising:
    positioning a wind turbine assembly atop a building, in proximity to a parapet of the building, such that the wind turbine assembly is exposed to an enhanced wind region created as wind flows over the parapet, along a wind flow path that is angled upward relative to horizontal, the wind turbine assembly including
       a support assembly including a base configured to couple to a building, in proximity to a parapet of the building, and further including a support projecting from the base, and
       a rotor assembly including a housing adjustably coupled to the support of the support assembly, and a rotor coupled to the housing and to an electric generator to generate an electrical current, the rotor including a plurality of radial blades defining an axis of rotation; and
    positioning the rotor assembly relative to the support assembly such that the rotor is located in the enhanced wind region and such that the rotor's axis of rotation is oriented at a selected, fixed downward pitch, in general alignment with the wind flow path;
    wherein the support of the support assembly includes an elongated pole projecting upward from the base of the support assembly, the pole including a curved upper portion;

wherein the housing of the rotor assembly includes a sleeve disposed about the elongated pole of the support assembly; and wherein the step of positioning the rotor assembly relative to the support assembly includes axially moving the sleeve along the curved upper portion of the elongated pole, to orient the rotor's axis of rotation at the selected, fixed downward pitch.

11. A method of generating electrical power, comprising:

positioning a wind turbine assembly atop a building, in proximity to a parapet of the building, such that the wind turbine assembly is exposed to an enhanced wind region created as wind flows over the parapet, along a wind flow path that is angled upward relative to horizontal, the wind turbine assembly including a support assembly including a base configured to couple to a building, in proximity to a parapet of the building, and further including both a support projecting from the base and a generally horizontal crossbar having a fixed orientation relative to the building, and a rotor assembly including a sleeve pivotally mounted to the crossbar and a rotor coupled to the sleeve and to an electric generator to generate an electrical current, the rotor including a plurality of radial blades defining an axis of rotation; and positioning the rotor assembly relative to the support assembly such that the rotor is located in the enhanced wind region, the step of positioning including pivoting the sleeve relative to the crossbar, to orient the rotor's axis of rotation at a selected downward pitch, in alignment with the wind flow path.

* * * * *